United States Patent
Yamasaki et al.

(10) Patent No.: US 11,603,039 B2
(45) Date of Patent: Mar. 14, 2023

(54) AUTOMATED DRIVING ENABLED VEHICLE

(71) Applicant: SUBARU CORPORATION, Tokyo (JP)

(72) Inventors: Kentarou Yamasaki, Tokyo (JP); Makoto Kinoshita, Tokyo (JP); Keisuke Takayama, Tokyo (JP); Yuta Muramatsu, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 192 days.

(21) Appl. No.: 16/985,953

(22) Filed: Aug. 5, 2020

(65) Prior Publication Data

US 2021/0094467 A1    Apr. 1, 2021

(30) Foreign Application Priority Data

Sep. 26, 2019   (JP) ............................ JP2019-175678

(51) Int. Cl.
| | |
|---|---|
| H04N 5/44 | (2011.01) |
| B60Q 1/52 | (2006.01) |
| B60W 60/00 | (2020.01) |
| B60Q 1/46 | (2006.01) |

(52) U.S. Cl.
CPC ............... *B60Q 1/52* (2013.01); *B60Q 1/46* (2013.01); *B60W 60/0053* (2020.02)

(58) Field of Classification Search
CPC .......... B60Q 1/52; B60Q 1/46; B60Q 1/0035; B60Q 1/50; B60W 60/0053; B60W 60/005
See application file for complete search history.

(56) References Cited

U.S. PATENT DOCUMENTS

| | | | |
|---|---|---|---|
| 8,930,085 B2 * | 1/2015 | Takeuchi | B60W 50/085 701/48 |
| 10,053,001 B1 | 8/2018 | Nabbe et al. | |
| 10,195,902 B1 * | 2/2019 | Lee | B60Q 9/00 |

(Continued)

FOREIGN PATENT DOCUMENTS

| | | |
|---|---|---|
| EP | 3 369 621 A1 | 9/2018 |
| GB | 2571149 A | 8/2019 |

(Continued)

OTHER PUBLICATIONS

U.S. PTO Non-Final Office Action issued in related U.S. Appl. No. 16/983,674, dated Apr. 29, 2021.

(Continued)

*Primary Examiner* — Munear T Akki
(74) *Attorney, Agent, or Firm* — McDermott Will & Emery LLP

(57) ABSTRACT

An automated driving enabled vehicle includes a travel controller, an automated driving indicator lamp, and a lamp controller. The automated driving indicator lamp is switched on perceptibly from outside the vehicle on the occasion of automated driving. On the occasion of switching of a driving state of the vehicle from the automated driving to manual driving, the lamp controller switches off the automated driving indicator lamp after changing a lighting state of the automated driving indicator lamp from a first lighting state during the execution of the automated driving to a second lighting state different from the first lighting state.

7 Claims, 6 Drawing Sheets

(56) References Cited

U.S. PATENT DOCUMENTS

| | | |
|---|---|---|
| 2017/0057542 A1 | 3/2017 | Kim et al. |
| 2017/0225567 A1 | 8/2017 | Tsuda |
| 2017/0229053 A1 | 8/2017 | Ishizuka et al. |
| 2017/0334455 A1* | 11/2017 | Asakura .............. B60J 3/04 |
| 2018/0017969 A1* | 1/2018 | Nagy ............... B60W 30/182 |
| 2018/0086260 A1 | 3/2018 | Barillot et al. |
| 2018/0173237 A1* | 6/2018 | Reiley ................ B60Q 1/525 |
| 2018/0304804 A1* | 10/2018 | Tatara ................ B60Q 1/50 |
| 2018/0312106 A1 | 11/2018 | Tatara et al. |
| 2018/0334088 A1 | 11/2018 | Salter et al. |
| 2018/0356818 A1* | 12/2018 | Arai ................ B60W 50/14 |
| 2019/0066548 A1* | 2/2019 | Dellock ............... B60Q 1/50 |
| 2019/0084585 A1 | 3/2019 | Fritz et al. |
| 2019/0111784 A1 | 4/2019 | Tsuda |
| 2019/0168664 A1 | 6/2019 | Tatara et al. |
| 2019/0210517 A1 | 7/2019 | Baker et al. |
| 2019/0248421 A1 | 8/2019 | Jacobsthal et al. |
| 2019/0270406 A1 | 9/2019 | Dubey et al. |
| 2020/0031274 A1* | 1/2020 | Redick ................ B60Q 9/00 |
| 2020/0130573 A1 | 4/2020 | Ito |
| 2020/0156532 A1 | 5/2020 | Lee et al. |
| 2020/0307648 A1 | 10/2020 | Noguchi et al. |
| 2021/0201885 A1* | 7/2021 | Bastyr ................ G10K 15/02 |

FOREIGN PATENT DOCUMENTS

| | | |
|---|---|---|
| JP | 2018-032433 A | 3/2018 |
| JP | 2019-064471 A | 4/2019 |

OTHER PUBLICATIONS

U.S. PTO Notice of Allowance issued in related U.S. Appl. No. 16/983,674, dated Sep. 2, 2021.

U.S. PTO Notice of Allowance issued in related U.S. Appl. No. 16/987,135 dated Jun. 6, 2022.

U.S. PTO Non-Final Office Action issued in related U.S. Appl. No. 16/987,174, dated Jun. 9, 2022.

U.S. PTO Non-Final Office Action issued in related U.S. Appl. No. 16/987,077, dated Jun. 22, 2022.

U.S. PTO Non-Final Office Action issued in related U.S. Appl. No. 16/983,614, dated Dec. 29, 2021.

U.S. PTO Notice of Allowance issued in related U.S. Appl. No. 16/987,174, dated Nov. 2, 2022.

U.S. PTO Notice of Allowance issued in related U.S. Appl. No. 16/987,077, dated Oct. 4, 2022.

* cited by examiner

AUTOMATED DRIVING ENABLED VEHICLE

CROSS-REFERENCE TO RELATED APPLICATIONS

This application claims priority from Japanese Patent Application No. 2019-175678 filed on Sep. 26, 2019, the entire contents of which are hereby incorporated by reference.

BACKGROUND

The technology relates to an automated driving enabled vehicle.

As to vehicles, research and development of automated driving, or automation of vehicle travel, has been in progress.

For example, vehicles in the future are expected to travel to a destination by an automatic control in response to setting of the destination, and to stop and park at the destination.

SUMMARY

An aspect of the technology provides an automated driving enabled vehicle including a travel controller, an automated driving indicator lamp, and a lamp controller. The travel controller is configured to control travel of the vehicle while switching a driving state of the vehicle between automated driving and manual driving. The automated driving indicator lamp is configured to be switched on perceptibly from outside the vehicle on the occasion of the automated driving. The lamp controller is configured to switch on the automated driving indicator lamp to indicate that the driving state is the automated driving, during execution of the automated driving in which the travel controller controls the travel of the vehicle by the automated driving. The lamp controller is configured to switch off the automated driving indicator lamp after changing a lighting state of the automated driving indicator lamp from a first lighting state during the execution of the automated driving to a second lighting state different from the first lighting state, on the occasion of switching of the driving state of the vehicle from the automated driving to the manual driving.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1A:
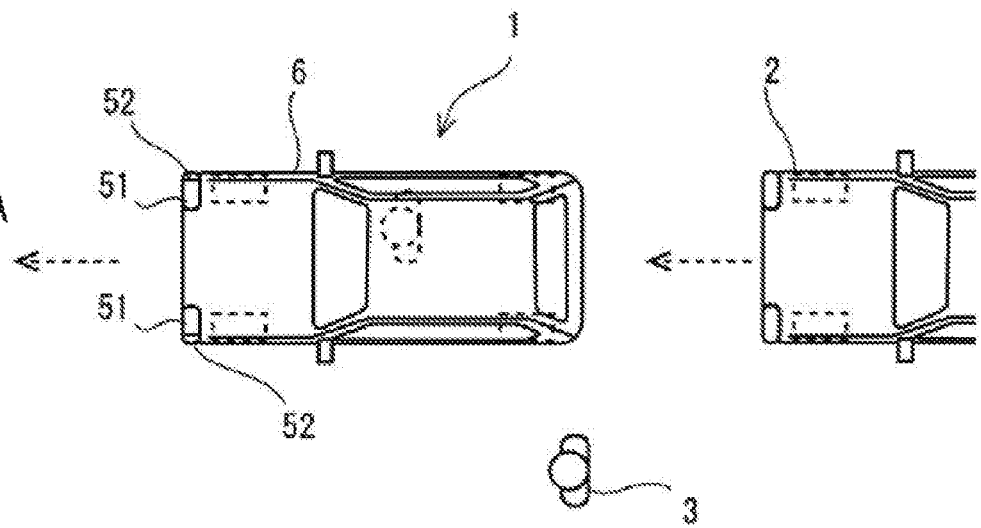
FIGS. 1A to 1C are schematic diagrams of an automated driving enabled automobile according to an embodiment of the technology.

The aims of automated driving enabled vehicles may possibly include making appropriate selection of a travel path, a safety check of a course, and an avoidance control of uncertainties, to travel to the destination without an unanticipated incident. Executing such a control for safer travel, however, would not guarantee safety to 100% perfection. The possibility is that even such a travel control by automated driving enabled vehicles will provide only a limited level of safety.

For example, automated driving enabled vehicles may include an automated driving indicator lamp. Automated driving enabled vehicles may switch on the automated driving indicator lamp perceptibly from outside them, in a case where they are executing automated driving. Reference is made to, for example, Japanese Unexamined Patent Application Publication (JP-A) Nos. 2018-032433 and 2019-064471.

Such an automated driving enabled vehicle switching on the automated driving indicator lamp during the execution of the automated driving makes it possible for occupants of surrounding vehicles or nearby pedestrians to grasp the situation that the vehicle is executing the automated driving, allowing the occupants or the pedestrians to take an action or a prior countermeasure in response to the situation. The surrounding vehicles may be on a road or a lane on which the automated driving enabled vehicle is traveling.

As described, a travel control of automated driving enabled vehicles themselves provides only a limited level of safety in their travel environment. Automated driving enabled vehicles owe their enhanced safety to cooperation with surrounding vehicles and pedestrians.

Automated driving enabled vehicles sometimes travel by the automated driving and sometimes travel by manual driving by an occupant.

Vehicles traveling by the automated driving may switch its driving state to the manual driving while traveling, for example.

After switching to the manual driving, vehicles travel in accordance with the occupant's driving operations, instead of traveling by the automated driving as before.

Vehicles traveling in accordance with the occupant's driving operations may make irregular movements, unlike the automated driving as before. This may cause possibility of lowered behavior predictability.

In particular, an occupant of a vehicle traveling by the automated driving who starts the manual driving in response to an abrupt request from the vehicle may have difficulty in appropriately grasping the current situation and driving.

Moreover, while the vehicle is switching its driving state from the automated driving to the manual driving, for example, surrounding vehicles are also traveling around the vehicle. The surrounding vehicles and their occupants may possibly fail to instantly and properly cope with the travel of the vehicle after switching its driving state from the automated driving to the manual driving.

The automated driving indicator lamp is switched on during the execution of the automated driving but is switched off at a start of the manual driving. But simply switching off the automated driving indicator lamp at the start of the manual driving may possibly fail to allow the surrounding vehicles traveling around the vehicle and their occupants to instantly and properly cope with the change in the driving state of the vehicle.

As described, automated driving enabled vehicles have had room for improvements.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

First Embodiment

Figure 1B:
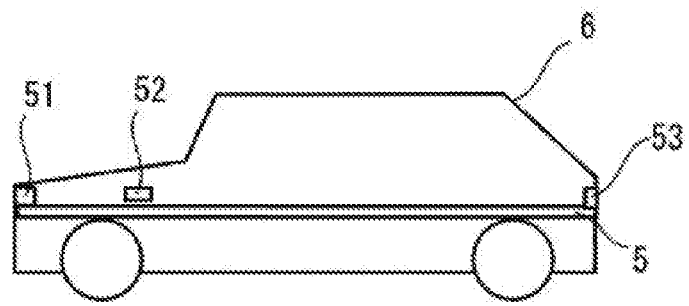
Figure 1C:
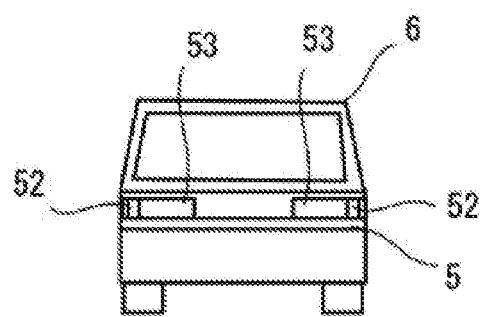

FIGS. 1A to 1C are schematic diagrams of an automated driving enabled automobile 1 according to an embodiment of the technology. In the following, the automated driving enabled automobile 1 is also simply referred to as an "automobile 1".

FIGS. 1A to 1C schematically illustrate the automobile 1. In one embodiment of the technology, the automobile 1 may serve as an "automated driving enabled vehicle" or a "vehicle".

FIG. 1A is a top view of the automobile 1. In FIG. 1A, the automobile 1 is assumed to be traveling on a driveway. FIG. 1A also illustrates a surrounding automobile 2 and a pedestrian 3. FIG. 1B is a side view of the automobile 1. FIG. 1C is a rear view of the automobile 1.

Referring to FIGS. 1A to 1C, the automobile 1 is configured to travel while switching between automated driving and manual driving. The automobile 1 includes an automated driving indicator lamp 5. The automated driving indicator lamp 5 is configured to be switched on, on the occasion of the automated driving.

The automated driving indicator lamp 5 may be a lamp that is switched on, to indicate that the automated driving is in execution. The automated driving indicator lamp 5 may circumscribe a vehicle body 6 of the automobile 1, for example, on all sides, i.e., front, rear, right and left sides, of the vehicle body 6. This makes it possible for those around the automobile 1, e.g., the pedestrian 3 and an occupant of the surrounding automobile 2, to visually recognize, from outside the automobile 1, illumination of the automated driving indicator lamp 5 on the occasion of the execution of the automated driving. Switching on the automated driving indicator lamp 5 on the occasion of the automated driving makes it possible to receive cooperation with the pedestrian 3 near the automobile 1 and the occupant of the surrounding automobile 2. Hence, it is possible to expect a higher level of safety than provided solely by a travel control of the automobile 1 itself.

The automated driving indicator lamp 5 may have other configurations than described above. For example, the automated driving indicator lamp 5 may be provided separately on four corners, i.e., front right, front left, rear right, and rear left corners, of the vehicle body 6. In one alternative, the automated driving indicator lamp 5 may be provided along an outer periphery of a roof panel over a vehicle cabin. In another alternative, the automated driving indicator lamp 5 may protrude from the roof panel.

The automated driving indicator lamp 5 is configured to be switched on, in a case where the automobile 1 is traveling by the automated driving. Moreover, it is desirable that presence or absence of the illumination of the automated driving indicator lamp 5 be perceptible to those outside the automobile 1, e.g., the pedestrian 3 and the occupant of the surrounding automobile 2, even in the summer daytime with strong sunlight around the automobile 1. Accordingly, the automated driving indicator lamp 5 may have a color or brightness that is rare in existence in the natural environment, e.g., turquoise blue. Moreover, the automated driving indicator lamp 5 may give illumination of a brighter color and higher brightness than anything in the natural environment. Strong illumination of turquoise blue light leads to higher possibility that the presence or the absence of the illumination of the automated driving indicator lamp 5 becomes more perceptible to those outside the automobile 1, e.g., the pedestrian 3 and the occupant of the surrounding automobile 2. This makes it possible for those outside the automobile 1, e.g., the pedestrian 3 and the occupant of the surrounding automobile 2, to take an action or a prior countermeasure in response to, for example, the automobile 1 executing the automated driving.

On the other hand, keeping the automated driving indicator lamp 5 on during the execution of the automated driving may cause an increase in power consumption of the automated driving enabled automobile 1. Giving the highly bright illumination of the automated driving indicator lamp 5 involves even more power consumption. In particular, for the electrically powered automobile 1, a steady increase in power consumption during the execution of the automated driving may shorten its cruising range and directly affect its travel performance.

Moreover, selecting the bright color that is rare in existence in the natural environment, e.g., turquoise blue, for the automated driving indicator lamp 5 may cause the possibility that continuous and steady illumination of the automated driving indicator lamp 5 makes those who perceive the illumination feel uncomfortable or incongruous. Those who work at a place with constant presence of the automated driving enabled automobile 1 are forced to keep perceiving bright color light that is rare in existence in the natural environment, e.g., turquoise blue.

Furthermore, the automated driving enabled automobile 1 may sometimes travel by the automated driving and sometimes travel by the manual driving by an occupant.

The automobile 1 traveling by the automated driving may switch its driving state to the manual driving while traveling, for example.

After switching to the manual driving, the automobile 1 travels in accordance with the occupant's driving operations, instead of traveling by the automated driving as before.

The automobile 1 traveling in accordance with the occupant's driving operations may make irregular movements, unlike the automated driving as before. This may cause possibility of lowered behavior predictability.

In particular, the occupant of the automobile 1 traveling by the automated driving who starts the manual driving in response to an abrupt request from the automobile 1 may have difficulty in appropriately grasping the current situation and driving.

Moreover, while the automobile 1 is switching its driving state from the automated driving to the manual driving, for example, the surrounding automobile 2 and the pedestrian 3 are also traveling around the automobile 1. The surrounding automobile 2, its occupant, and the pedestrian 3 may possibly fail to instantly and properly cope with the travel of the automobile 1 after switching its driving state from the automated driving to the manual driving.

The automated driving indicator lamp 5 is switched on during the execution of the automated driving but is switched off at a start of the manual driving. But simply switching off the automated driving indicator lamp 5 at the start of the manual driving may possibly fail to allow the surrounding automobiles traveling around the automobile 1 and their occupants to instantly and properly cope with the change in the driving state of the automobile 1.

As described, the automated driving enabled automobile 1 has had room for improvements.

Figure 2:
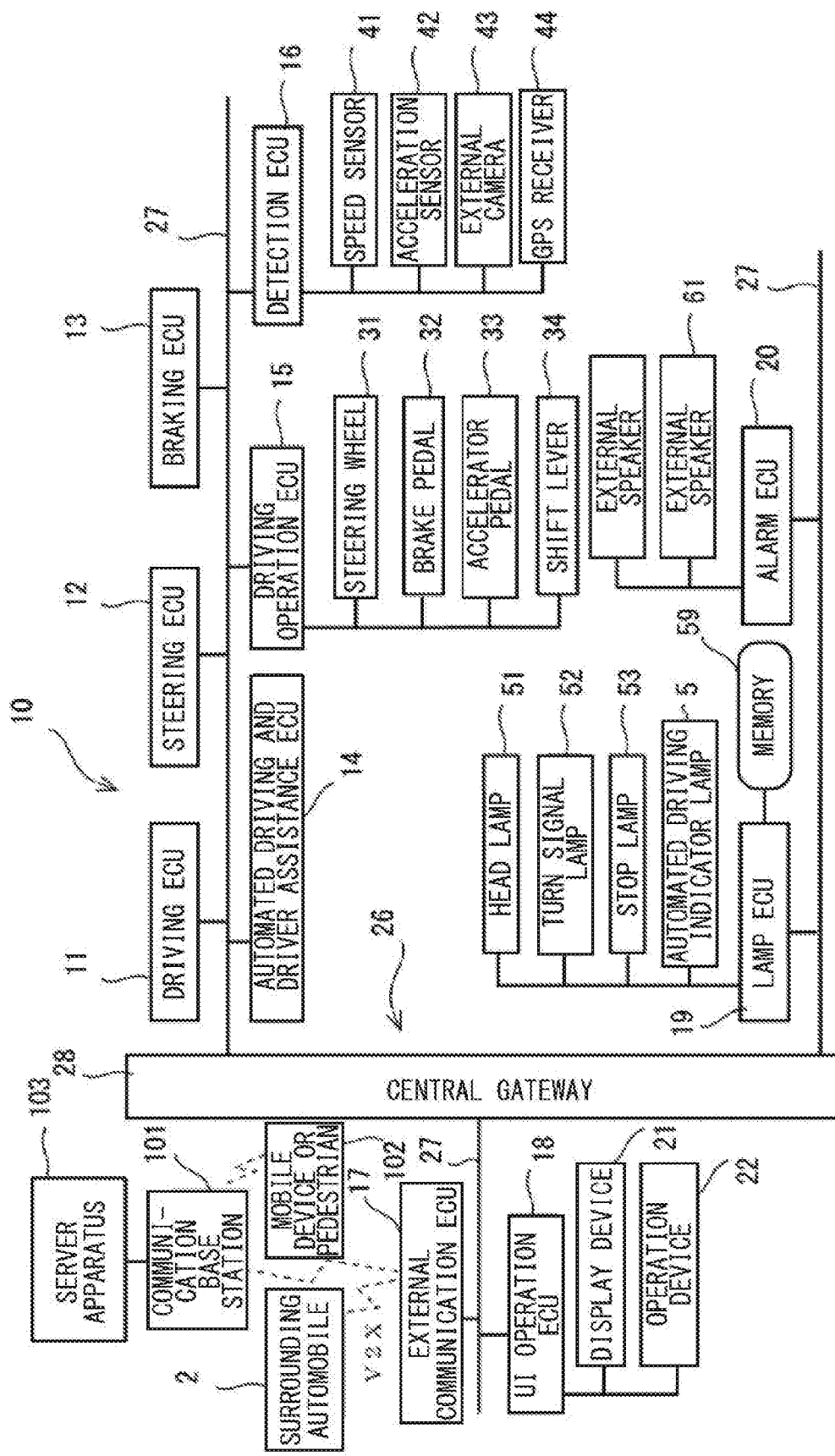
FIG. 2 is a block diagram of a control system of the automobile illustrated in FIGS. 1A to 1C.

FIG. 2 illustrates a control system 10 of the automobile 1 in FIGS. 1A to 1C. The control system 10 of the automobile 1 may include a plurality of controllers that are installed in their respective control ECUs (electronic control units). In FIG. 2, each of the plurality of the controllers is typically represented by a corresponding one of the control ECUs. Each of the plurality of the controllers may include not only the control ECU but also a storage member, input and output ports, a timer, and an internal bus to which the control ECU, the storage member, the input and output ports, and the timer are coupled. The storage member may hold, for example, a control program and data. The input and output ports may be coupled to an object to be controlled, and/or to a device that detects a state of the object to be controlled. The timer may measure time and timing.

As illustrated in FIG. 2, in one specific but non-limiting example, the control ECUs may include a driving ECU 11, a steering ECU 12, a braking ECU 13, an automated driving and driver assistance ECU 14, a driving operation ECU 15, a detection ECU 16, an external communication ECU 17, a UI operation ECU 18, a lamp ECU 19, and an alarm ECU 20. The control system 10 of the automobile 1 may further include other undepicted control ECUs.

The plurality of the control ECUs may be coupled to a vehicle network 26 adopted by the automobile 1 such as a CAN (controller area network) and a LIN (local interconnect network). The vehicle network 26 may include a plurality of bus cables 27 and a CGW (central gateway) 28. The plurality of the bus cables 27 is able to be coupled to the plurality of the control ECUs. The central gateway 28 may serve as a relay device to which the plurality of the bus cables 27 is coupled. To the plurality of the control ECUs, their respective IDs (identifications) may be assigned. The IDs may differ from one another and serve as identification information. Each of the control ECU may output, basically on a periodical basis, notification data to one or more of the other control ECUs. To the notification data, the ID of the sender control ECU and the ID of the receiver control ECU may be attached. The other control ECUs than the sender control ECU may monitor the respective ones of the bus cables 27 to which they are coupled. For example, in a case where any one of the other control ECUs finds the ID of the receiver control ECU to match its own ID, the relevant control ECU may acquire the notification data and execute processing based on the notification data. The central gateway 28 may monitor each of the plurality of the bus cables 27 coupled to the central gateway 28. In a case where the central gateway 28 detects one or more of the other control ECUs coupled to any one of the bus cables 27 different from the bus cable 27 to which the sender control ECU is coupled, the central gateway 28 may supply the notification data to the relevant one of the bus cables 27. With such relay processing by the central gateway 28, it is possible for each of the control ECUs to send the notification data to one or more of the other control ECUs coupled to respective ones of the bus cables 27 different from the bus cable 27 to which the sender control ECU is coupled. It is also possible for each of the control ECUs to receive the notification data from any one of the control ECUs coupled to the corresponding one of the bus cables 27 different from the bus cable 27 to which the receiver control ECU is coupled.

The external communication ECU 17 may perform wireless communication with, for example, a communication base station 101 and a communication device of the surrounding automobile 2. The communication base station 101 and the surrounding automobile 2 are present outside the automobile 1. The communication base station 101 may be, for example, a base station of an ADAS (advanced driver assistance system) communication network, or alternatively, the communication base station 101 may be, for example, a base station of a carrier communication network. The base station of the carrier communication network may communicate not only with the communication device of the surrounding automobile 2 but also with a mobile device 102 held by the pedestrian 3. The external communication ECU 17 may be divided into a plurality of subunits for respective categories of partners with whom the external communication ECU 17 communicates directly, and the subunits may be provided in the automobile 1. The communication base station 101, the communication device of the surrounding automobile 2, and the mobile device 102, together with a server apparatus 103, may constitute a traffic system 100. The external communication ECU 17 may transmit and receive communication data to and from the server apparatus 103, the surrounding automobile 2, or the mobile device 102 by directly performing wireless communication with the communication base station 101 or the communication device of the surrounding automobile 2.

To the UI operation ECU 18, a display device 21 and an operation device 22 may be coupled as, for example, a user interface device with the occupant of the automobile 1. The display device 21 may include, for example, a liquid crystal device or a video projection device, or both. The operation device 22 may be, for example, a touchscreen, a keyboard, or a contactless operation sensing device, or any combination thereof. The display device 21 and the operation device 22 may be mounted on, for example, an inner surface of the vehicle cabin in which the occupant rides. The UI operation ECU 18 may acquire the notification data from the vehicle network 26, and display the notification data on the display device 21. The UI operation ECU 18 may output, to the vehicle network 26, an operation input made on the operation device 22. Moreover, the UI operation ECU 18 may perform processing based on the operation input and incorporate a result of the processing in the notification data. The UI operation ECU 18 may provide, for example, display of a navigation screen on the display screen 21. The navigation screen may allow for setting of, for example, a destination. The UI operation ECU 18 may search a path to the destination selected by the operation input. The UI operation ECU 18 may incorporate data regarding the path in the notification data. The data regarding the path may include attribute information regarding, for example, lanes of roads to be used to move from a current position to the destination.

To the driving operation ECU 15, coupled may be operation members that allow the occupant to control the travel of the automobile 1. Specific but non-limiting examples of the operation members may include a steering wheel 31, a brake pedal 32, an accelerator pedal 33, and a shift lever 34. If any operation is made on the operation members, the driving operation ECU 15 may output, to the vehicle network 26, the notification data including, for example, presence or absence of the operation and an amount of the operation. Moreover, the driving operation ECU 15 may execute processing regarding the operation on the operation members, and incorporate a result of the processing in the notification data. For example, if any operation is made on the accelerator pedal 33, with presence of surrounding moving bodies and/or fixed objects in a traveling direction of the automobile 1, the driving operation ECU 15 may make a determination that the operation on the accelerator pedal 33 is an abnormal operation. The driving operation ECU 15 may incorporate the result of the determination in the notification data.

To the detection ECU 16, coupled may be detection members that detect a travel state of the automobile 1. Specific but non-limiting examples of the detection members may include a speed sensor 41, an acceleration sensor 42, an external camera 43, and a GPS receiver 44. The speed sensor 41 may detect a speed of the automobile 1. The acceleration sensor 42 may detect an acceleration rate of the automobile 1. The external camera 43 may capture an image of external surroundings of the automobile 1, and include, for example, a stereo camera. The GPS receiver 44 may serve as a GNSS (global navigation satellite system) receiver that detects a position of the automobile 1. The detection ECU 16 may acquire detection information from the detection members. The detection ECU 16 may output the notification data including the detection information to the vehicle network 26. Furthermore, the detection ECU 16 may execute processing based on the detection information and incorporate a result of the processing in the notification data. For example, in a case where the acceleration sensor 42 detects the acceleration rate being higher than a threshold of detection of a collision, the detection ECU 16 may make a determination that a collision has been detected. The detection ECU 16 may incorporate the result of the determination in the notification data. The detection ECU 16 may extract a moving body such as the pedestrian 3 or the surrounding automobile 2 that are present around the automobile 1, on the basis of the image of the external camera 43. The detection ECU 16 may determine a kind and attributes of the moving body, and make estimation of a relative direction, a relative distance, and a direction of movement of the moving body in accordance with a position, a size, and a change of the moving body in the image. The detection ECU 16 may incorporate information regarding the moving body including a result of the estimation in the notification data and output the notification data to the vehicle network 26.

The automated driving and driver assistance ECU 14 may acquire the notification data from the vehicle network 26 and switch a travel control state, i.e., the driving state, of the automobile 1 between the automated driving and the manual driving.

Moreover, the automated driving and driver assistance ECU 14 may acquire the notification data from the vehicle network 26, execute a control for the automated driving or driver assistance of the automobile 1, and generate travel control data to output the travel control data to the driving ECU 11, the steering ECU 12, and the braking ECU 13. The driving ECU 11, the steering ECU 12, and the braking ECU 13 may control the travel of the automobile 1 on the basis of the travel control data to be supplied.

In one embodiment of the technology, the automated driving and driver assistance ECU 14 may serve as a "travel controller".

In one specific but non-limiting example, in performing the automated driving of the automobile 1, the automated driving and driver assistance ECU 14 may acquire the notification data from the vehicle network 26 and search or acquire the path to the destination. The automated driving and driver assistance ECU 14 may acquire the notification data from the vehicle network 26, determine presence or absence of an abnormality or uncertainties in the automobile 1. In a case without any abnormality or uncertainties in the automobile 1, the automated driving and driver assistance ECU 14 may generate the travel control data regarding a course to be traveled along the path, and output the generated travel control data as the notification data. The automated driving and driver assistance ECU 14 may control the travel of the automobile 1 on the basis of positional information of the automobile 1 from, for example, the GPS receiver 44, to allow the automobile 1 to travel along the path of its movement until an arrival at the destination, i.e., until the automobile 1 stops, for example, in a parking lot at the destination. In a case with an abnormality or uncertainties with respect to the automobile 1, the automated driving and driver assistance ECU 14 may generate the travel control data to avoid the abnormality or the uncertainties, and output the generated travel control data as the notification data.

In assisting with driving of the automobile 1, the automated driving and driver assistance ECU 14 may acquire the notification data regarding the operation input from the UI operation ECU 18 through the vehicle network 26. The automated driving and driver assistance ECU 14 may generate the travel control data in which an operation based on the operation input is adjusted, and output the travel control data as the notification data. The automated driving and driver assistance ECU 14 may control the travel of the automobile 1 in accordance with a driving operation by the occupant. In a case with an abnormality or uncertainties with respect to the automobile 1, the automated driving and driver assistance ECU 14 may generate the travel control data to avoid the abnormality or the uncertainties, and output the generated travel control data as the notification data.

To the lamp ECU 19, coupled may be head lamps 51, turn signal lamps 52, stop lamps 53, and the automated driving indicator lamp 5. The head lamps 51 may be provided in a front part of the vehicle body 6 of the automobile 1. The turn signal lamps 52 may be provided on front right, front rear, rear right, and rear left corners of the vehicle body 6. The stop lamps 53 may be provided in a rear part of the vehicle body 6. The head lamps 51, the turn signal lamps 52, and the stop lamps 53 may be provided separately from the automated driving indicator lamp 5 and configured to be switched on perceptibly from outside the vehicle body 6 of the automobile 1.

In one embodiment of the technology, the head lamps 51, the turn signal lamps 52, or the stop lamps 53, or any combination thereof may serve as a "lamp device".

Moreover, as illustrated in the figure, a memory 59 may be coupled to the lamp ECU 19. The memory 59 coupled to the lamp ECU 19 may hold programs and setting values the lamp ECU 19 uses for a control.

In one embodiment of the technology, the lamp ECU 19 may serve as a "lamp controller".

In one specific but non-limiting example, the lamp ECU 19 may acquire, from the vehicle network 26, the notification data for a lamp control. In accordance with the notification data acquired, the lamp ECU 19 may control lighting states of the head lamps 51, the turn signal lamps 52, the stop lamps 53, and the automated driving indicator lamp 5. For example, in a case where the automated driving and driver assistance ECU 14 is controlling the travel of the automobile 1 by the automated driving, the lamp ECU 19 may switch on the automated driving indicator lamp 5 during the execution of the automated driving. This makes it possible for the moving body outside the automobile 1, e.g., the pedestrian 3 and the surrounding automobile 2, to visually recognize, with the clue of the illumination of the automated driving indicator lamp 5, that the automobile 1 is executing the automated driving. Hence, it is possible for the moving body outside the automobile 1, e.g., the pedestrian 3 and the surrounding automobile 2, to cope with the travel of the automobile 1 executing the automated driving. The lamp ECU 19 may perform a lighting control to switch off the automated driving indicator lamp 5, in a case where, for example, travel environment of the automobile 1 renders it unnecessary to switch on the automated driving indicator lamp 5 regardless of the execution of the automated driving.

To the alarm ECU 20, an external speaker 61 may be coupled. The alarm ECU 20 may acquire the notification data regarding an alarm output from the vehicle network 26 and output an alarm sound from the external speaker 61 in response to the notification data thus acquired.

Figure 3:
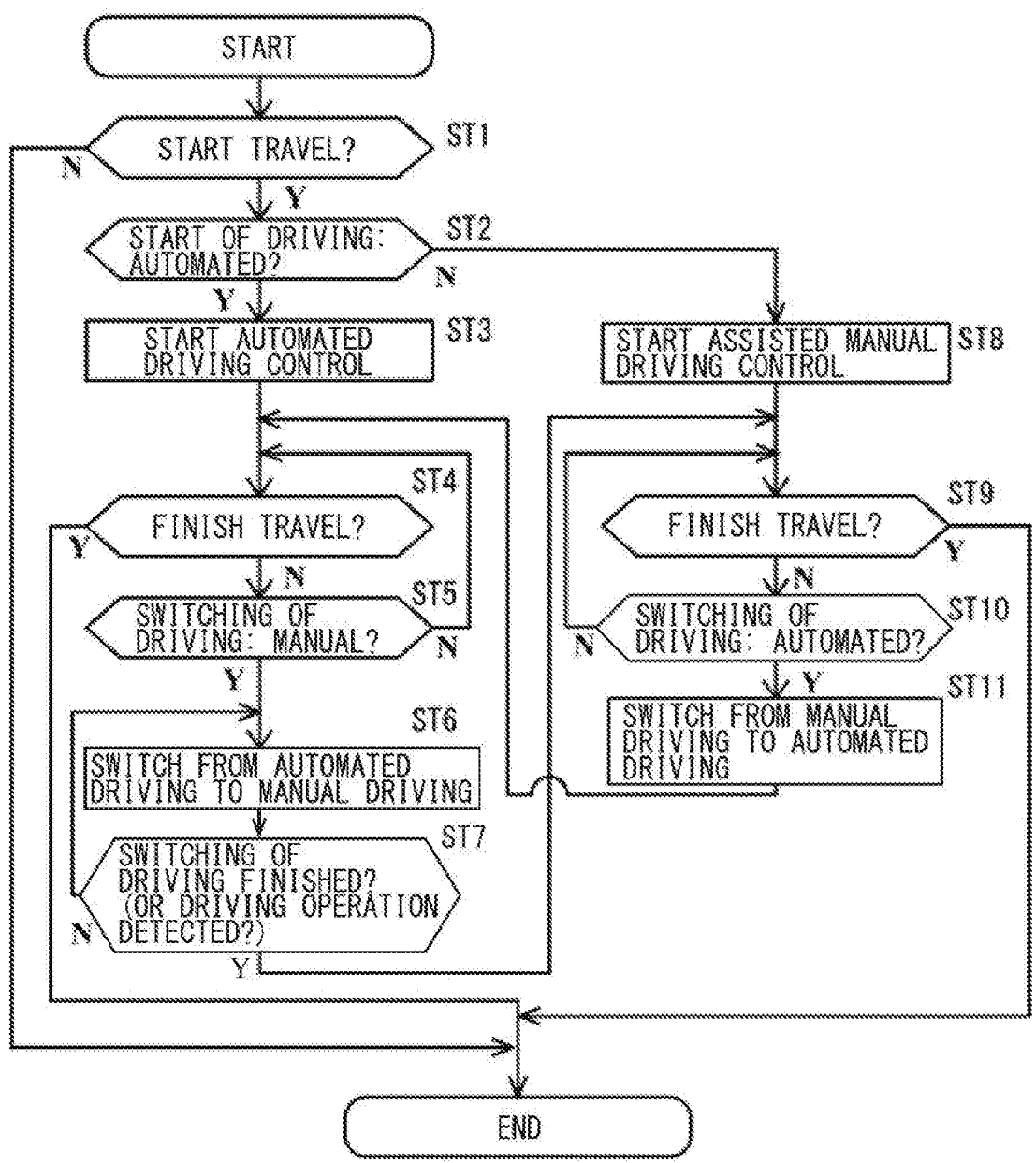
FIG. 3 is a flowchart of a switching control between automated driving and assisted manual driving.

FIG. 3 is a flowchart of a switching control between the automated driving and assisted manual driving. The automated driving and driver assistance ECU 14 may repeatedly execute processing of FIG. 3 in a case where, for example, the occupant rides in the automobile 1.

In step ST1, the automated driving and driver assistance ECU 14 may determine whether or not to start the travel of the automobile 1. In a case where the travel of the automobile 1 is not going to be started (N in step ST1), the automated driving and driver assistance ECU 14 may terminate the processing of FIG. 3. In a case where the travel of the automobile 1 is going to be started (Y in step ST1), the automated driving and driver assistance ECU 14 may cause the processing to proceed to step ST2.

In step ST2, the automated driving and driver assistance ECU 14 may determine whether or not the travel of the automobile 1 is controlled by the automated driving. The automated driving and driver assistance ECU 14 may determine whether or not the travel of the automobile 1 is controlled by the automated driving on the basis of, for example, a setting value of a driving mode acquired from the UI operation ECU 18. In a case where the travel of the automobile 1 is controlled by the automated driving (Y in step ST2), the automated driving and driver assistance ECU 14 may cause the processing to proceed to step ST3. In a case where the travel of the automobile 1 is not controlled by the automated driving but is otherwise controlled by the manual driving, e.g., by the assisted manual driving (N in step ST2), the automated driving and driver assistance ECU 14 may cause the processing to proceed to step ST8.

In step ST3, the automated driving and driver assistance ECU 14 may start the travel by the automated driving. The automated driving and driver assistance ECU 14 may control the travel of the automobile 1 by the automated driving.

In step ST4, the automated driving and driver assistance ECU 14 may determine whether or not to finish the travel of the automobile 1. The automated driving and driver assistance ECU 14 may determine that the travel of the automobile 1 is going to be finished, in a case where the positional information of the automobile 1 indicates that the automobile 1 is stopped, for example, in a parking lot at the destination of the automated driving, with the acceleration rate being zero (0). The positional information of the automobile 1 may be acquired from the external communication ECU 17 or the GPS receiver 44. In a case where the automated driving and driver assistance ECU 14 determines that the travel of the automobile 1 is going to be finished (Y in step ST4), the automated driving and driver assistance ECU 14 may terminate the processing of FIG. 3. Thus, the travel by the automated driving is finished. In a case where the automated driving and driver assistance ECU 14 does not determine that the travel of the automobile 1 is going to be finished (N in step ST4), the automated driving and driver assistance ECU 14 may cause the processing to proceed to step ST5.

In step ST5, the automated driving and driver assistance ECU 14 may determine whether or not to switch the travel of the automobile 1 from the automated driving to otherwise than the automated driving, e.g., the manual driving. The automated driving and driver assistance ECU 14 may determine that the travel of the automobile 1 is going to be switched from the automated driving, on the basis of, for example, the setting value of the driving mode acquired from the UI operation ECU 18. In a case where the travel of the automobile 1 is not going to be switched from the automated driving to otherwise than the automated driving (N in step ST5), the automated driving and driver assistance ECU 14 may cause the processing to return to step ST4. The automated driving and driver assistance ECU 14 may repeat the determinations of steps ST4 and ST5 while the automated driving is in execution. In a case where the travel of the automobile 1 is going to be switched from the automated driving to otherwise than the automated driving (Y in step ST5), the automated driving and driver assistance ECU 14 may cause the processing to proceed to step ST6.

In step ST6, the automated driving and driver assistance ECU 14 may switch the travel of the automobile 1 from the automated driving to otherwise than the automated driving, e.g., the assisted manual driving. Thus, the travel by the automated driving is finished, and the travel by the manual driving is started. Thereafter, the automated driving and driver assistance ECU 14 may cause the processing to proceed to step ST7.

In step ST7, the automated driving and driver assistance ECU 14 may determine whether or not switching from the automated driving to the assisted manual driving has been finished. The automated driving and driver assistance ECU 14 may determine whether or not the switching from the automated driving to the assisted manual driving has been finished, on the basis of, for example, presence or absence of the occupant's operation on the operation members of the driving operation ECU 15 to control the travel of the automobile 1. In a case where the occupant has not started operating the operation members of the driving operation ECU 15 (N in step ST7), the automated driving and driver assistance ECU 14 may cause the processing to return to step ST6. In a case where the occupant has started operating the operation members of the driving operation ECU 15 (Y in step ST7), the automated driving and driver assistance ECU 14 may cause the processing to proceed to step ST9.

In step ST8, the automated driving and driver assistance ECU 14 may start the assisted manual driving or otherwise than the automated driving.

In step ST9, the automated driving and driver assistance ECU 14 may determine whether or not to finish the travel of the automobile 1. For example, the automated driving and driver assistance ECU 14 may determine that the travel of the automobile 1 is going to be finished, in a case where the automobile 1 is stopped, with the acceleration rate being zero (0), and an operation is made on an ignition switch of the automobile 1. In a case with a determination that the travel of the automobile 1 is going to be finished (Y in step ST9), the automated driving and driver assistance ECU 14 may terminate the processing of FIG. 3. Thus, the travel by the assisted manual driving is finished. In a case without the determination that the travel of the automobile 1 is going to be finished (N in step ST9), the automated driving and driver assistance ECU 14 may cause the processing to proceed to step ST10.

In step ST10, the automated driving and driver assistance ECU 14 may determine whether or not to switch the travel of the automobile 1 from the assisted manual driving to the automated driving. The automated driving and driver assistance ECU 14 may determine that the travel of the automobile 1 is going to be switched from the assisted manual driving, on the basis of, for example, the setting value of the driving mode acquired from the UI operation ECU 18. In a case where the travel of the automobile 1 is not going to be switched from the assisted manual driving to the automated driving (N in step ST10), the automated driving and driver assistance ECU 14 may cause the processing to return to step ST9. The automated driving and driver assistance ECU 14 may repeat the determinations of steps ST9 and ST10 while the assisted manual driving is in execution. In a case where the travel of the automobile 1 is going to be switched from the assisted manual driving to the automated driving (Y in step ST10), the automated driving and driver assistance ECU 14 may cause the processing to proceed to step ST11.

In step ST11, the automated driving and driver assistance ECU 14 may switch the travel of the automobile 1 from the assisted manual driving to the automated driving. Thus, the travel by the assisted manual driving is finished, and the travel by the automated driving is started. Thereafter, the automated driving and driver assistance ECU 14 may cause the processing to proceed to step ST4.

As described, the automated driving and driver assistance ECU 14 may repeatedly execute the processing of FIG. 3, in a case where, for example, the automobile 1 is traveling, with the occupant riding therein. For example, the automated driving and driver assistance ECU 14 may acquire, through the vehicle network 26, the notification data inclusive of setting information of the driving mode from the UI operation ECU 18, and switch the travel of the automobile 1 between the automated driving and the assisted manual driving. Moreover, the automated driving and driver assistance ECU 14 may acquire the notification data inclusive of an instruction to compulsively switch to the manual driving, and switch the travel of the automobile 1 between the automated driving and the assisted manual driving. Such an instruction may be based on, for example, detection of an abnormality from the detection ECU 16. Furthermore, the automated driving and driver assistance ECU 14 itself may generate the notification data inclusive of the instruction based on the detection of an abnormality, to compulsively switch to the manual driving, and switch the travel of the automobile 1 between the automated driving and the assisted manual driving.

In switching the travel of the automobile 1 from the automated driving to the assisted manual driving, the automated driving and driver assistance ECU 14 may detect that the occupant has started the driving operation on the operation members of the driving operation ECU 15, and finish a process of the switching from the automated driving to the assisted manual driving.

Figure 4:
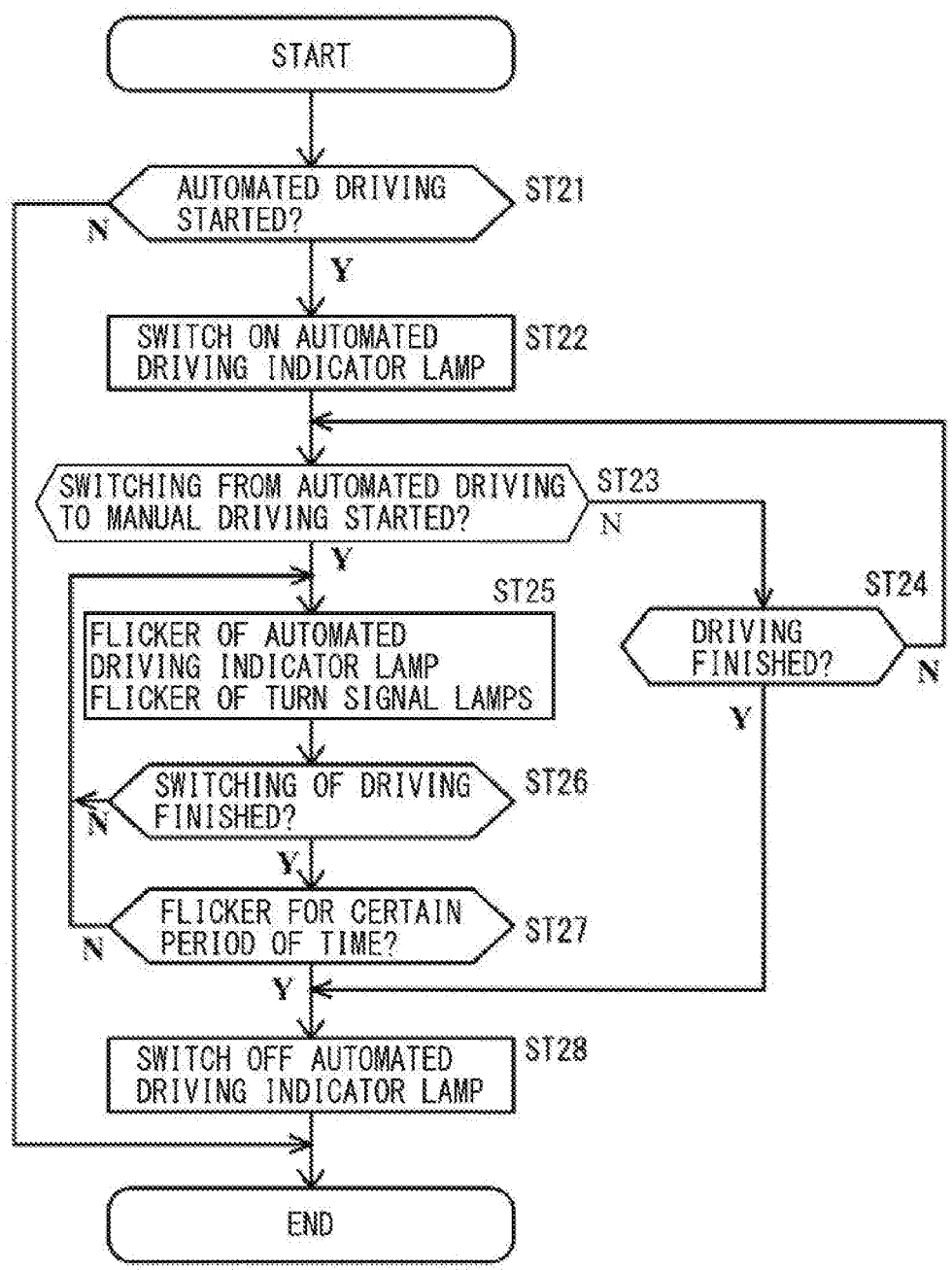
FIG. 4 is a flowchart of a lighting control of an automated driving indicator lamp in accordance with the switching control between the automated driving and the assisted manual driving illustrated in FIG. 3, according to a first embodiment of the technology.

FIG. 4 is a flowchart of the lighting control of the automated driving indicator lamp 5 in accordance with the switching control between the automated driving and the assisted manual driving illustrated in FIG. 3, according to a first embodiment of the technology.

The lamp ECU 19 may repeatedly execute processing of FIG. 4, while keeping on acquiring, as the notification data, information from the automated driving and driver assistance ECU 14 controlling the travel of the automobile 1.

In step ST21, the lamp ECU 19 may determine whether or not the travel of the automobile 1 by the automated driving has been started. The lamp ECU 19 may acquire, for example, information and/or notification the automated driving and driver assistance ECU 14 outputs to the vehicle network 26 for a control of the automated driving, and determine whether or not the travel of the automobile 1 by the automated driving has been started. In a case where the travel of the automobile 1 by the automated driving has not been started (N in step ST21), the lamp ECU 19 may terminate the processing of FIG. 4. In a case where the travel of the automobile 1 by the automated driving has been started (Y in step ST21), the lamp ECU 19 may cause the processing to proceed to step ST22.

In step ST22, the lamp ECU 19 may switch on the automated driving indicator lamp 5 that has been off.

In step ST23, the lamp ECU 19 may determine whether or not the process of the switching of the travel of the automobile 1 from the automated driving to the manual driving has been started. In a case where the automated driving and driver assistance ECU 14 has started the process of step ST6, the lamp ECU 19 may determine that the process of the switching of the travel of the automobile 1 from the automated driving to the manual driving has been started (Y in step ST23), and cause the processing to proceed to step ST25. In a case where the process of the switching of the travel of the automobile 1 from the automated driving to the manual driving has not been started (N in step ST23), the lamp ECU 19 may cause the processing to proceed to step ST24.

In step ST24, the lamp ECU 19 may determine whether or not the travel of the automobile 1 by the automated driving has been finished. For example, the lamp ECU 19 may determine whether or not the travel of the automobile 1 by the automated driving has been finished, on the basis of an end of acquisition of the information supplied to the vehicle network 26 from the automated driving and driver assistance ECU 14 for the control of the automated driving. Alternatively, the lamp ECU 19 may determine whether or not the travel of the automobile 1 by the automated driving has been finished, by acquiring notification that the automated driving has been finished. In a case where the travel of the automobile 1 by the automated driving has not been finished (N in step ST24), the lamp ECU 19 may cause the processing to return to step ST23. The lamp ECU 19 may repeat the determination processes of steps ST23 and ST24.

In a case where the travel of the automobile 1 by the automated driving has been finished (Y in step ST24), the lamp ECU 19 may cause the processing to proceed to step ST28.

In step ST25, the lamp ECU 19 may change the lighting state of the automated driving indicator lamp 5, from a first lighting state during the execution of the automated driving, e.g., continuous illumination, to a second lighting state different from the first lighting state, e.g., flicker, without instantly switching off the automated driving indicator lamp 5.

Moreover, the lamp ECU 19 may change a lighting state of the turn signal lamps 52, together with the lighting state of the automated driving indicator lamp 5, causing flicker of the automated driving indicator lamp 5 and the turn signal lamps 52.

In one embodiment of the technology, the turn signal lamps 52 may serve as an "emergency flickering indicator lamp" configured to notify the switching of the driving state of the automobile 1.

At this occasion, the lamp ECU 19 may cause alternate flicker of the automated driving indicator lamp 5 and the turn signal lamps 52.

In step ST26, the lamp ECU 19 may determine whether or not the switching control to the manual driving by the automated driving and driver assistance ECU 14 has been finished. In one embodiment of the technology, the automated driving and driver assistance ECU 14 may serve as the "travel controller". The lamp ECU 19 may determine that the switching control to the manual driving has been finished, in the case where in step ST7, the automated driving and driver assistance ECU 14 determines that the switching from the automated driving to the assisted manual driving has been finished. In a case where the switching control to the manual driving has not been finished (N in step ST26), the lamp ECU 19 may cause the processing to return to step ST25, and continue the flicker of the automated driving indicator lamp 5 and the turn signal lamps 52. In a case where the switching control to the manual driving has been finished (Y in step ST26), the lamp ECU 19 may cause the processing to proceed to step ST27.

In step ST27, the lamp ECU 19 may determine whether or not the flicker of the automated driving indicator lamp 5 and the turn signal lamps 52 has continued for a certain, prescribed period of time or longer. In a case where the flicker of the automated driving indicator lamp 5 and the turn signal lamps 52 has not continued for the certain period of time or longer (N in step ST27), even after the automated driving and driver assistance ECU 14 determines, in step ST7, that the switching from the automated driving to the assisted manual driving has been finished, the lamp ECU 19 may cause the processing to return to step ST25, and continue the flicker of the automated driving indicator lamp 5 and the turn signal lamps 52. In a case where the flicker of the automated driving indicator lamp 5 and the turn signal lamps 52 has continued for the certain period of time or longer (Y in step ST27), the lamp ECU 19 may cause the processing to proceed to step ST28.

In step ST28, the lamp ECU 19 may switch off the automated driving indicator lamp 5 that has been switched on.

As described, the lamp ECU 19 may basically switch on the automated driving indicator lamp 5 during the execution of the automated driving in which the automated driving and driver assistance ECU 14 controls the travel of the automobile 1 by the automated driving.

Moreover, on the occasion of the switching from the automated driving to the manual driving, the lamp ECU 19 may cause the flicker of the automated driving indicator lamp 5 that has been sending out the continuous illumination during the execution of the automated driving, without instantly switching off the automated driving indicator lamp 5. The lamp ECU 19 may change the lighting state of the automated driving indicator lamp 5 from the first lighting state during the execution of the automated driving.

Furthermore, the lamp ECU 19 may switch off the automated driving indicator lamp 5, after the switching control by the automated driving and driver assistance ECU 14 is finished and the lamp ECU 19 allows the automated driving indicator lamp 5 to be on flickering for the certain period of time.

As described, in this embodiment, the automated driving indicator lamp 5 is configured to be switched on perceptibly from outside the automobile 1 on the occasion of the automated driving. The lamp ECU 19 is configured to control the lighting state of the automated driving indicator lamp 5. On the occasion of the switching of the driving state of the automobile 1 from the automated driving to the manual driving, the lamp ECU 19 is configured not to instantly switch off the automated driving indicator lamp 5, but to switch off the automated driving indicator lamp 5 after changing the lighting state of the automated driving indicator lamp 5 from the first lighting state during the execution of the automated driving to the second lighting state different from the first lighting state, i.e., the flicker.

For example, the lamp ECU 19 may change the lighting state of the automated driving indicator lamp 5 from the first lighting state during the execution of the automated driving, at a start of the switching control of the driving state of the automobile 1 from the automated driving to the manual driving. The lamp ECU 19 may switch off the automated driving indicator lamp 5, at an end of the switching control to the manual driving.

Thus, the change in the driving state of the automobile 1 from the automated driving to the manual driving is accompanied by the change in the lighting state of the automated driving indicator lamp 5 from the continuous illumination as before during the execution of the automated driving. This makes it possible for those traveling around the automobile 1, e.g., the surrounding automobile 2 and its occupant, to easily grasp the change in the driving state of the automobile 1 executing the automated driving. The surrounding automobile 2 is traveling around the automobile 1 that is about to switch its driving state from the automated driving to the manual driving. Hence, it is highly probable for those traveling around the automobile 1, e.g., the surrounding automobile 2 and its occupant, to instantly and properly cope with the change in the driving state of the automobile 1.

In particular, the automated driving and driver assistance ECU 14 may finish the switching control from the automated driving to the manual driving, in response to the detection of the driving operation by the occupant. This makes it possible to ensure that at the timing when the automated driving indicator lamp 5 is switched off that has had its lighting state changed from the continuous illumination to the flicker, the automobile 1 is being controlled by the manual driving, and has been already switched to the manual driving. Hence, switching off the automated driving indicator lamp 5 makes it possible for those traveling around the automobile 1, e.g., the surrounding automobile 2 and its occupant, to surely understand, with the clue of the timing when the automated driving indicator lamp 5 is switched off, that the driving state of the automobile 1 has been surely switched to the manual driving. In addition, it is possible for those traveling around the automobile 1, e.g., the surrounding automobile 2 and its occupant, to be continuously cautious of the travel and the movements of the automobile 1 until the automated driving indicator lamp 5 is switched off.

Furthermore, in this embodiment, even after the switching control by the automated driving and driver assistance ECU 14 is finished, the automated driving indicator lamp 5 is configured not to be switched off but to be kept on, until the lamp ECU 19 allows the automated driving indicator lamp 5 to be on flickering for the certain period of time. In this way, it is highly probable that manual operations by the occupant are made to an appropriate extent at the timing when the automated driving indicator lamp 5 is switched off. It is possible for those traveling around the automobile 1, e.g., surrounding automobiles and their occupants, to anticipate and watch out for possible irregular movements due to the switching of the driving state, until the automated driving indicator lamp 5 is switched off, i.e., during the flicker of the automated driving indicator lamp 5 after the change from the continuous illumination.

In addition, in this embodiment, on the occasion of the switching of the driving state of the automobile 1 from the automated driving to the manual driving, the lamp ECU 19 is configured to change not only the lighting state of the automated driving indicator lamp 5 but also the lighting state of the turn signal lamps 52. The turn signal lamps 52 are configured to be switched on perceptibly from outside the automobile 1. This brings about a special lighting state in which the automated driving indicator lamp 5 and the turn signal lamps 52 flicker together, on the occasion of the switching of the driving state of the automobile 1 from the automated driving to the manual driving. Hence, it is possible for those traveling around the automobile 1, e.g., the surrounding automobile 2 and its occupant, to easily understand that the driving state of the automobile 1 is special, or unusual.

Second Embodiment

Description is given next of the automobile 1 according to a second embodiment of the technology. In the following description, differences from the forgoing embodiment are mainly described. Similar constituent elements to those of the forgoing embodiment are denoted by the same reference numerals as those of the forgoing embodiment, and description thereof is omitted.

Figure 5:
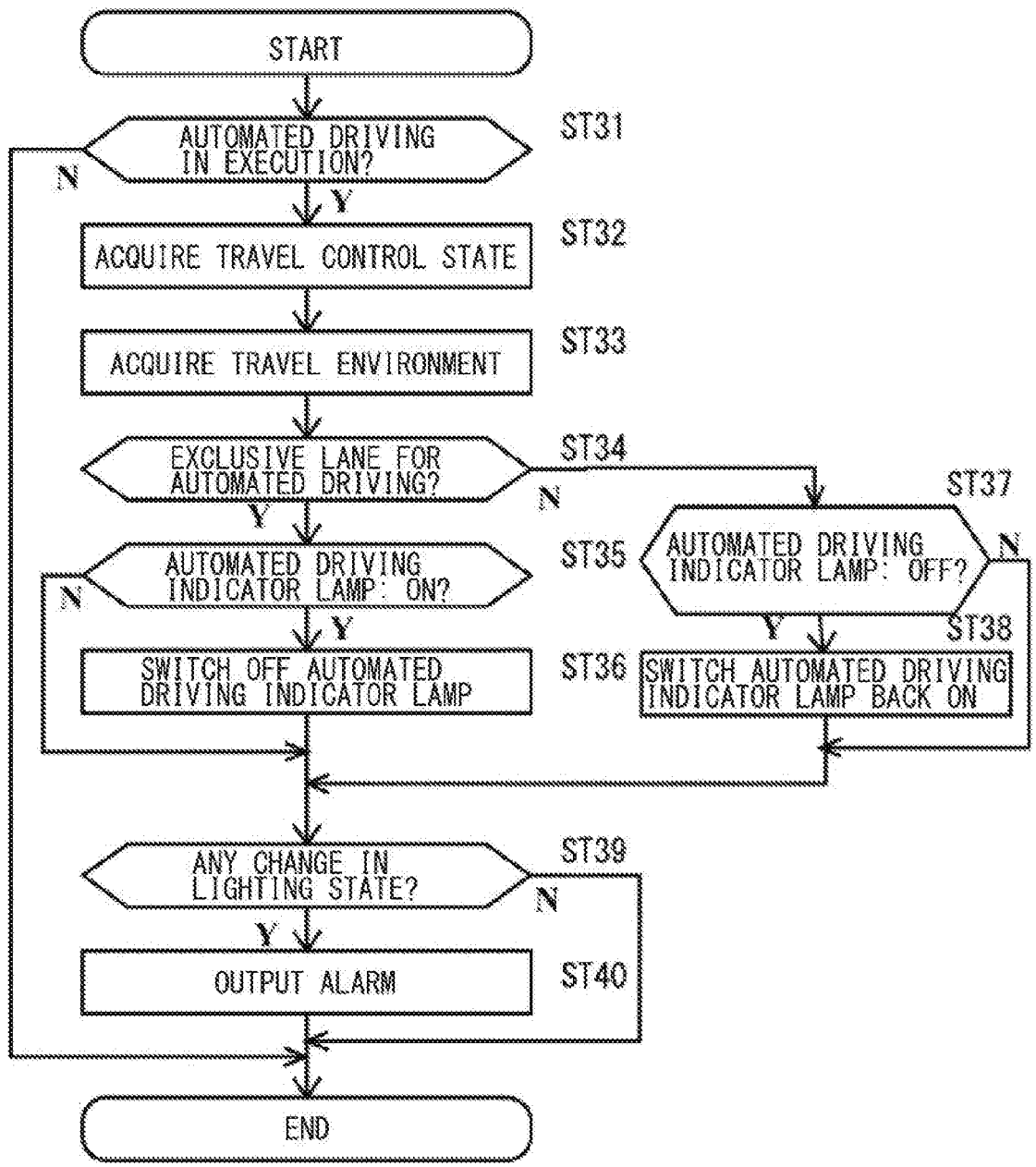
FIG. 5 is a flowchart of a lighting state control of the automated driving indicator lamp during execution of the automated driving according to a second embodiment of the technology.

FIG. 5 is a flowchart of a lighting state control of the automated driving indicator lamp 5 during the execution of the automated driving according to a second embodiment of the technology.

The lamp ECU 19 may repeatedly execute processing of FIG. 5, while keeping on acquiring, as the notification data, the information from the automated driving and driver assistance ECU 14 controlling the travel of the automobile 1 by, for example, the automated driving.

In one embodiment of the technology, the lamp ECU 19 may serve as the "lamp controller".

In step ST31, the lamp ECU 19 may determine whether or not the automated driving is in execution. The lamp ECU 19 may acquire, for example, the information and/or the notification the automated driving and driver assistance ECU 14 outputs to the vehicle network 26 for the control of the automated driving, and determine whether or not the automated driving is in execution. In a case where the automated driving is not in execution (N in step ST31), the lamp ECU 19 may terminate the processing of FIG. 5. In a case where the automated driving is in execution (Y in step ST31), the lamp ECU 19 may cause the processing to proceed to step ST32.

In step ST32, the lamp ECU 19 may acquire information regarding the travel control state, i.e., the driving state, of the automobile 1, as the notification data, from the various control ECUs of the automobile 1 through the vehicle network 26. The lamp ECU 19 may acquire, for example, information regarding the position, the speed, the acceleration rate, the course, presence or absence of a failure, and lighting states of various lamps, as to the automobile 1.

In step ST33, the lamp ECU 19 may acquire information regarding the travel environment, as the notification data, from the various control ECUs of the automobile 1 such as the external communication ECU 17 and the detection ECU 16 through the vehicle network 26. The lamp ECU 19 may acquire, for example, attribute information regarding a lane being traveled by the automobile 1. In addition, for example, the lamp ECU 19 may further acquire information regarding a position, a speed, a predicted course, possibility of a collision, and attributes of a surrounding moving body present around the automobile 1. The external communication ECU 17 is configured to acquire the attribute information regarding the lane of the road being traveled, on the basis of navigation information, V2V (virtual to virtual) received information, and ETC (electronic toll collection system) information by the ADAS communication. The detection ECU 16 is configured to detect the lane being traveled, by the image captured by the external camera 43. Moreover, the detection ECU 16 is configured to detect whether or not the lane being traveled by the automobile 1 is an exclusive lane for the automated driving, by a road surface mark, a sign, and gates of an entrance and an exit of the exclusive lane for the automated driving that are captured in the image.

In step ST34, the lamp ECU 19 may determine whether or not a traveling position of the automobile 1 is on the exclusive lane for the automated driving. In a case where the automobile 1 is traveling on the exclusive lane for the automated driving (Y in step ST34), the lamp ECU 19 may cause the processing to proceed to step ST35. In a case where the automobile 1 is not traveling on the exclusive lane for the automated driving (N in step ST34), the lamp ECU 19 may cause the processing to proceed to step ST37.

The "exclusive lane for the automated driving" refers to one or more lanes set as lanes dedicated to automated driving vehicles, out of a plurality of lanes in the same direction. The exclusive lane for the automated driving may also refer to a road dedicated to automated driving vehicles. In this case, the exclusive lane for the automated driving is basically traveled only by the automobile 1 executing the automated driving. Meanwhile, the automobile 1 that is not able to execute the automated driving, and the automobile 1 that is not executing the automated driving, are supposed to travel on a normal lane and a normal road other than the exclusive lane for the automated driving. The external communication ECU 17 may acquire, from the server apparatus 103, lane information, that is, the attribute information regarding the road being traveled. The lane information may be included in the navigation information regarding the path and/or the ETC information. The external communication ECU 17 or the lamp ECU 19 may determine whether or not the lane being traveled is the exclusive lane for the automated driving, on the basis of the information acquired by the external communication ECU 17. In addition, for example, the external communication ECU 17 may acquire these pieces of the information by, for example, inter-vehicle communication, to make the determination. Moreover, the external camera 43 may capture an image of the road being traveled by the automobile 1. The detection ECU 16 or the lamp ECU 19 may detect, from the contents of the captured image, the road surface mark, the sign, and the gates of the entrance and the exit of the exclusive lane for the automated driving being traveled. On the basis of these pieces of information, the external communication ECU 17 may determine whether or not the lane being traveled by the automobile 1 is the exclusive lane for the automated driving.

In step ST35, the lamp ECU 19 may determine whether or not the automated driving indicator lamp 5 is on. In a case where the automated driving indicator lamp 5 is on (Y in step ST35), the lamp ECU 19 may cause the processing to proceed to step ST36. In a case where the automated driving indicator lamp 5 is not on (N in step ST35), the lamp ECU 19 may cause the processing to proceed to step ST39.

In step ST36, the lamp ECU 19 may switch off the automated driving indicator lamp 5 that has been on. The lamp ECU 19 may switch off the automated driving indicator lamp 5 that has been on, after an elapse of a certain period of time from the determination process of step ST34. This makes it possible to ensure that the automobile 1 is traveling in an exclusive place for the automated driving, at timing when the automated driving indicator lamp 5 is switched off.

In step ST37, the lamp ECU 19 may determine whether or not the automated driving indicator lamp 5 is off. In a case where the automated driving indicator lamp 5 is not off (N in step ST37), the lamp ECU 19 may cause the processing to proceed to step ST39. In a case where the automated driving indicator lamp 5 is off (Y in step ST37), the lamp ECU 19 may cause the processing to proceed to step ST38.

In step ST38, the lamp ECU 19 may switch the automated driving indicator lamp 5 back on that has been off.

In step ST39, the lamp ECU 19 may determine if there has been any change in the lighting state of the automated driving indicator lamp 5. The lamp ECU 19 may determine that there has been a change in the lighting state of the automated driving indicator lamp 5, in a case where the automated driving indicator lamp 5 that has been on is switched off, or in a case where the automated driving indicator lamp 5 is switched back on that has been off. In a case with the change in the lighting state of the automated driving indicator lamp 5 (Y in step ST39), the lamp ECU 19 may cause the processing to proceed to step ST40. In a case without the change in the lighting state of the automated driving indicator lamp 5 (N in step ST39), the lamp ECU 19 may terminate the processing of FIG. 5.

In step ST40, the lamp ECU 19 may output, to the vehicle network 26, an instruction to output an alarm. The alarm ECU 20 may acquire, from the vehicle network 26, the instruction to output the alarm. Thereupon, the alarm ECU 20 may output an alarm sound from the external speaker 61. The alarm ECU 20 may output the alarm, in the case with the change in the lighting state of the automated driving indicator lamp 5 during the execution of the automated driving in which the automated driving and driver assistance ECU 14 controls the travel of the automobile 1 by the automated driving. Those around the automobile 1, e.g., the occupant of the nearby surrounding automobile 2, can hear the alarm sound.

As described, the lamp ECU 19 is configured to change the lighting state of the automated driving indicator lamp 5 during the execution of the automated driving, in response to the change in the travel control state, i.e., the driving state, or the change in the travel environment, or both. The lamp ECU 19 may switch off the automated driving indicator lamp 5 during the execution of the automated driving, in the case where the travel environment renders it unnecessary to switch on the automated driving indicator lamp 5 regardless of the execution of the automated driving. Non-limiting examples of such travel environment may include the exclusive place for the automated driving.

Moreover, in the travel environment other than the exclusive place for the automated driving, the lamp ECU 19 may switch the automated driving indicator lamp 5 back on that has been off during the execution of the automated driving on the exclusive lane for the automated driving. Furthermore, the alarm ECU 20 may output the alarm in the case with the change in the lighting state of the automated driving indicator lamp 5 during the execution of the automated driving.

Figure 6:
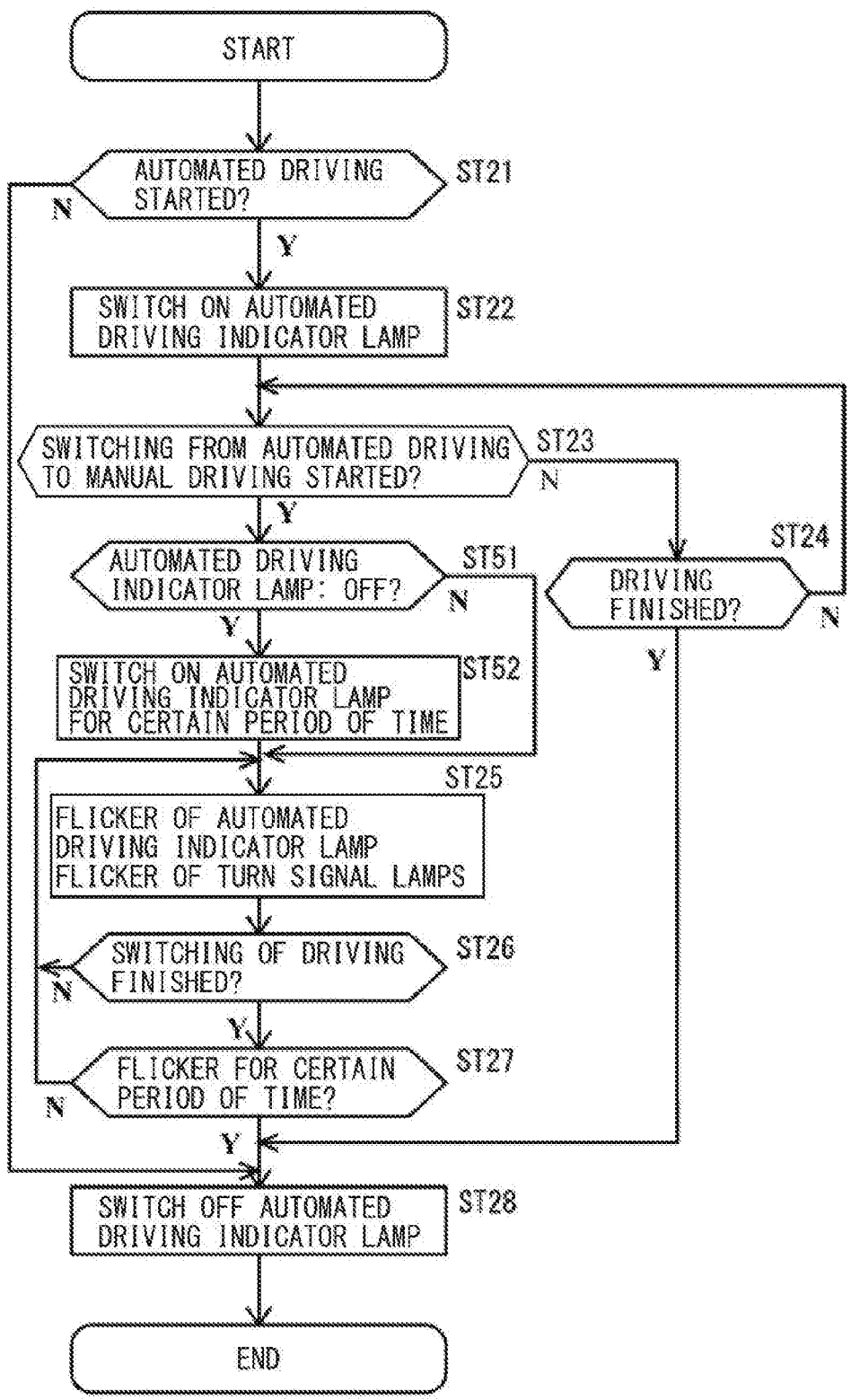
FIG. 6 is a flowchart of a lighting control of the automated driving indicator lamp in accordance with the switching control between the automated driving and the assisted manual driving, according to the second embodiment of the technology.

FIG. 6 is a flowchart of a lighting control of the automated driving indicator lamp 5 in accordance with the switching control between the automated driving and the assisted manual driving, according to the second embodiment of the technology.

The lamp ECU 19 may repeatedly execute processing of FIG. 6 instead of the processing of FIG. 4, while keeping on acquiring, as the notification data, the information from the automated driving and driver assistance ECU 14 controlling the travel of the automobile 1.

In step ST23, in a case where the lamp ECU 19 determines that the process of the switching of the travel of the automobile 1 from the automated driving to the manual driving has been started (Y in step ST23), the lamp ECU 19 may cause the processing to proceed to step ST51.

In step ST51, the lamp ECU 19 may determine whether or not the automated driving indicator lamp 5 is off. In a case where the automated driving indicator lamp 5 is not off (N in step ST51), the lamp ECU 19 may cause the processing to proceed to step ST25. In a case where the automated driving indicator lamp 5 is off (Y in step ST51), the lamp ECU 19 may cause the processing to proceed to step ST52.

In step ST52, the lamp ECU 19 may switch the automated driving indicator lamp 5 back on that has been off, and allow the automated driving indicator lamp 5 to be on for the certain period of time. Thereafter, the lamp ECU 19 may cause the processing to proceed to step ST25.

As described, in this embodiment, the lamp ECU 19 is configured to switch off the automated driving indicator lamp 5 during the execution of the automated driving. On the occasion of the switching to the manual driving during the execution of the automated driving with the automated driving indicator lamp 5 off, the lamp ECU 19 may switch the automated driving indicator lamp 5 back on that has been off during the execution of the automated driving. Thereafter, the lamp ECU 19 may change the lighting state of the automated driving indicator lamp 5 to the flicker.

In this way, even in the case where the automated driving indicator lamp 5 is switched off during the execution of the automated driving, it is possible to allow the automated driving indicator lamp 5 to be on continuously for the certain period of time on the occasion of the switching from the automated driving to the manual driving, to indicate that the automated driving is in execution, and thereafter, to change the lighting state of the automated driving indicator lamp 5 to the flicker, to indicate the switching to the manual driving. The continuous illumination of the automated driving indicator lamp 5 before the change in the lighting state indicates that the automated driving is in execution, making it possible for those traveling around the automobile 1, e.g., the surrounding automobile 2 and its occupant, to easily grasp the switching of the travel control state, i.e., the driving state, of the automobile 1 from the automated driving to the manual driving.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, in the forgoing embodiments, on the occasion of the switching of the driving state of the automobile 1 from the automated driving to the manual driving, the lamp ECU 19 may change not only the lighting state of the automated driving indicator lamp 5 but also the lighting state of the turn signal lamps 52. The turn signal lamps 52 are configured to be switched on perceptibly from outside the automobile 1.

In an alternative example, the lamp ECU 19 may cause flicker of other lamps than the turn signal lamps 52, e.g., the stop lamps 53, together with the flicker of the automated driving indicator lamp 5.

In either case, the combination of the lighting states of the lamps including the automated driving indicator lamp 5 may be a particular combination of the lighting states that is unlikely to occur during the execution of the normal automated driving or the normal manual driving. This makes it possible for those traveling around the automobile 1, e.g., the surrounding automobile 2 and its occupant, to easily understand that the travel control state, i.e., the driving state, of the automobile 1 is special, or unusual.

The automated driving and driver assistance ECU 14 and the lamp ECU 19 illustrated in FIG. 2 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the automated driving and driver assistance ECU 14 and the lamp ECU 19. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the automated driving and driver assistance ECU 14 and the lamp ECU 19 illustrated in FIG. 2.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An automated driving enabled vehicle, comprising:
a travel controller configured to switch a driving state of the vehicle between automated driving and manual driving;
an automated driving indicator lamp configured to be switched on and off perceptibly from outside the vehicle; and
a lamp controller configured to switch a lighting state of the automated driving indicator lamp among a first lighting state, a second lighting state, and a third lighting state based on the driving state of the automated driving,
wherein, during execution of the automated driving in which the travel controller controls the travel of the vehicle by the automated driving, the lamp controller switches the lighting state of the automated driving indicator lamp to the first lighting state in which the automated driving indicator is turned on for continuous illumination,
wherein, when the travel controller switches the driving state of the vehicle from the automated driving to the manual driving in response to detection of a driving operation by an occupant of the vehicle, the lamp controller switches the lighting state of the automated driving indicator lamp from the first lighting state to the second lighting state in which the automated driving indicator lamp flickers,
wherein, after switching to the second lighting state, the lamp controller determines whether the automated driving indicator lamp flickered for a prescribed period of time,
wherein, when the lamp controller determines that the automated driving indicator lamp has flickered for the prescribed period of time, the lamp controller switches the lighting state of the automated driving indicator lamp from the second lighting state to the third lighting state in which the automated driving indicator lamp is turned off.

2. An automated driving enabled vehicle, comprising:
a travel controller configured to switch a driving state of the vehicle between automated driving and manual driving;
an automated driving indicator lamp configured to be switched on and off perceptibly from outside the vehicle; and
a lamp controller configured to switch a lighting state of the automated driving indicator lamp among a first lighting state, a second lighting state, and a third lighting state based on the driving state is the automated driving,
wherein, during execution of the automated driving in which the travel controller controls the travel of the vehicle by the automated driving, the lamp controller switches the lighting state of the automated driving indicator lamp to the first lighting state in which the automated driving indicator is turned on for continuous illumination,
wherein, when the travel controller switches the driving state of the vehicle from the automated driving to the manual driving, the lamp controller switches the lighting state of the automated driving indicator lamp from the first lighting state to the second lighting state in which the automated driving indicator lamp flickers, wherein, after switching to the second lighting state, the lamp controller determines whether the automated driving indicator lamp flickered for a prescribed period of time, wherein, when the lamp controller determines that the automated driving indicator lamp has not flickered for the prescribed period of time, the lamp controller maintains the lighting state of the automated driving indicator lamp to the second lighting state, and wherein, when the lamp controller determines that the automated driving indicator lamp has flickered for the prescribed period of time, the lamp controller switches the lighting state of the automated driving indicator lamp from the second lighting state to the third lighting state in which the automated driving indicator lamp is turned off.

3. The automated driving enabled vehicle according to claim 1, further comprising a lamp device provided separately from the automated driving indicator lamp and configured to be switched on perceptibly from outside the vehicle, wherein the lamp controller is configured to change a lighting state of the lamp device together with the lighting state of the automated driving indicator lamp when switching the driving state of the vehicle from the automated driving to the manual driving.

4. The automated driving enabled vehicle according to claim 2, further comprising a lamp device provided separately from the automated driving indicator lamp and configured to be switched on perceptibly from outside the vehicle, wherein the lamp controller is configured to change a lighting state of the lamp device together with the lighting state of the automated driving indicator lamp, on the occasion of the when switching the driving state of the vehicle from the automated driving to the manual driving.

5. The automated driving enabled vehicle according to claim 3, wherein the lamp device comprises an emergency flickering indicator lamp of the vehicle, and the lamp controller is configured to cause flicker of both the automated driving indicator lamp and the emergency flickering indicator lamp when switching the driving state of the vehicle from the automated driving to the manual driving.

6. The automated driving enabled vehicle according to claim 4, wherein the lamp device comprises an emergency flickering indicator lamp of the vehicle, and the lamp controller is configured to cause flicker of both the automated driving indicator lamp and the emergency flickering indicator lamp when switching the driving state of the vehicle from the automated driving to the manual driving.

7. The automated driving enabled vehicle according to claim 2, wherein the travel controller switches from the automated driving to the manual driving in response to detection of a driving operation by an occupant of the vehicle.

* * * * *